Aug. 16, 1960     H. A. VANDER KAAY     2,949,097
FIVE POSITION CONTROL VALVE HAVING POWER FLOAT POSITION
Filed Dec. 11, 1957     3 Sheets-Sheet 1

INVENTOR
Henry A. Vander Kaay
BY
*Dodge and Sons*
ATTORNEYS

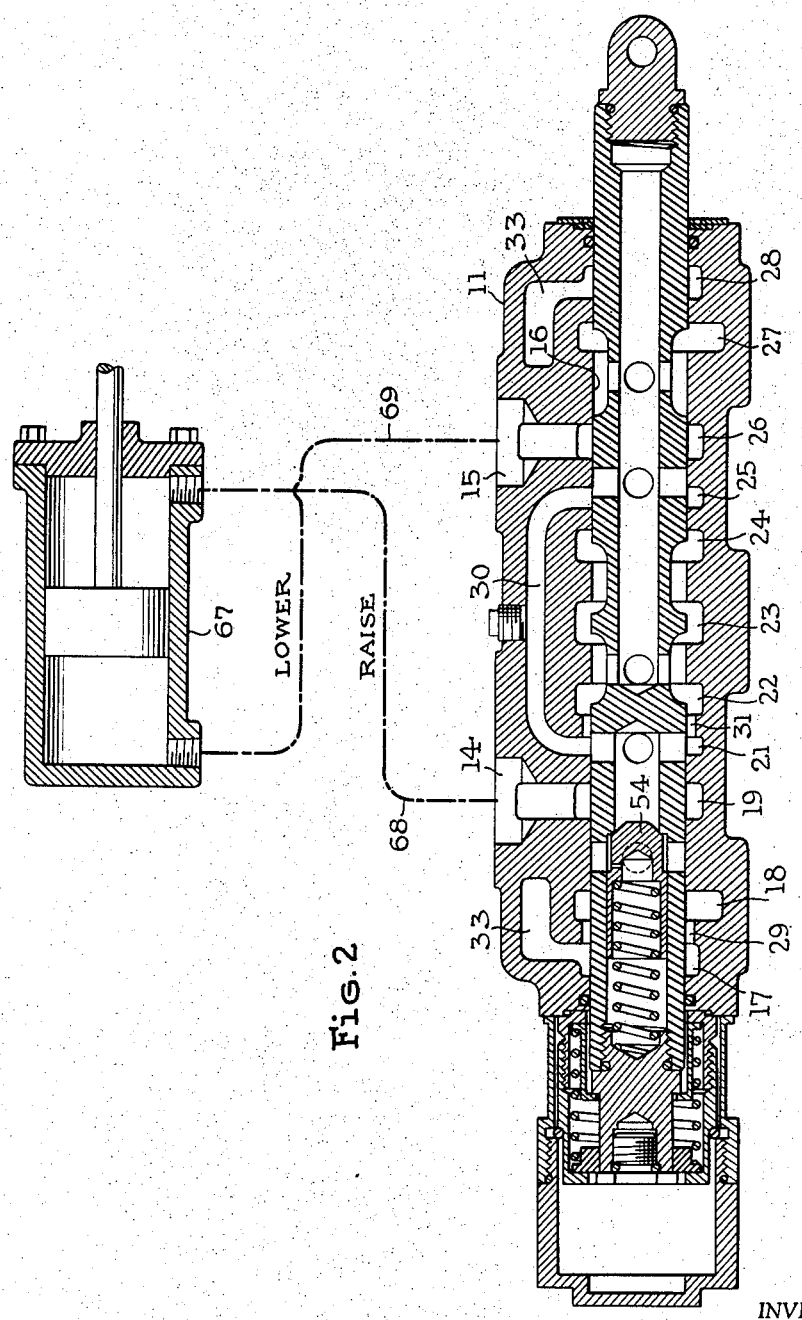

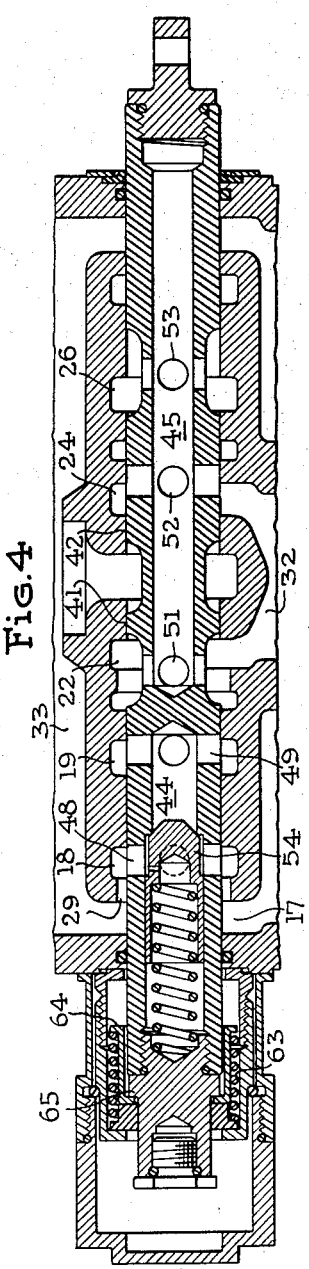
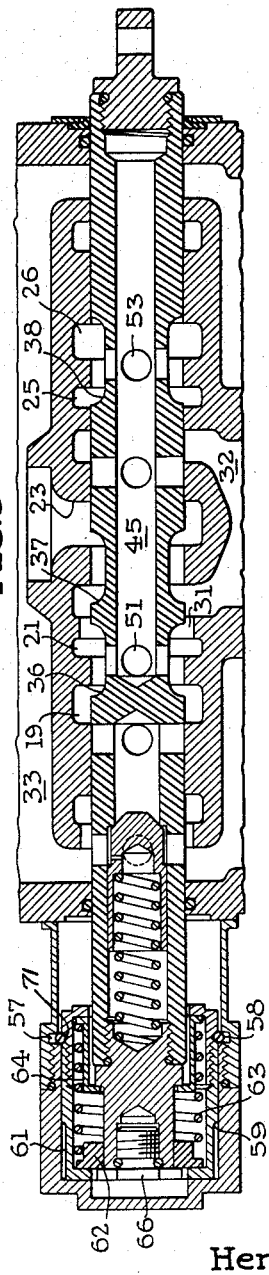
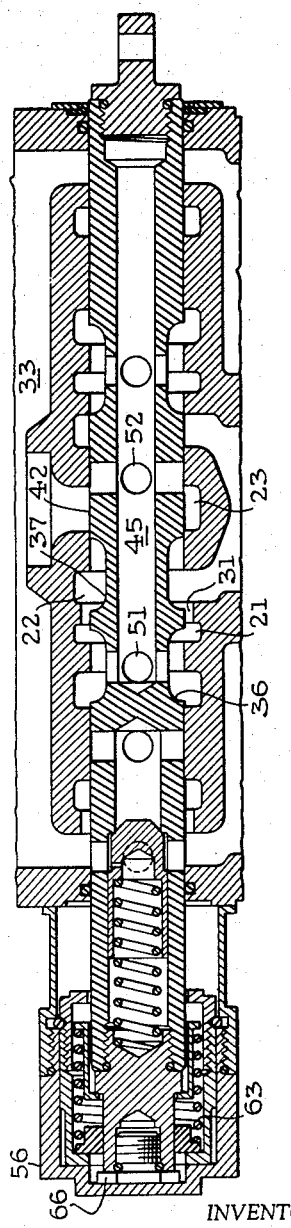

United States Patent Office 2,949,097
Patented Aug. 16, 1960

2,949,097

FIVE POSITION CONTROL VALVE HAVING POWER FLOAT POSITION

Henry A. Vander Kaay, Kalamazoo, Mich., assignor to The New York Air Brake Company, a corporation of New Jersey Filed Dec. 11, 1957, Ser. No. 702,147

3 Claims. (Cl. 121—46.5)

This invention relates to control valves for double-acting fluid pressure motors.

A typical device of this type is an open-center valve which, together with a reservoir, a pump and a double-acting differential area piston motor, form a control system for positioning the earth-moving blade of a bulldozer. Usually these valves have four operative positions, viz: a "raise" position in which the pump and reservoir are connected with opposite sides of the fluid motor; a "lower" position in which the pump and reservoir connections with the fluid motor are reversed; a "neutral" or "hold" position in which the connection with each side of the fluid motor is blocked and the pump is unloaded to the reservoir; and a "float" position in which both sides of the fluid motor are placed in communication with the pump and an unloading path is established between the pump and the reservoir.

In the past, the "float" position has been made to serve in two separate and conflicting capacities; in the first, it permits the blade to drop from a raised position and in the second, it allows free movement of the blade in operations such as back-dragging. In some cases, during the blade dropping operation, the weight of the blade causes the motor piston to move at such a rate that the fluid entering the expanding chamber of the motor cannot keep pace and voids are created in this chamber. When the valve is subsequently shifted to the "lower" position, the piston motor lags the operator's command until the voids are filled. This condition can be improved by providing a flow restriction in the path from the pump to the reservoir. The restriction creates a back pressure which forces a portion of the pump output into the expanding chamber of the fluid motor. This solution would be satisfactory if the "float" position of the valve served only in the blade dropping capacity, because this operation takes only a few seconds and the heating caused by the restriction would be negligible. However, when it is remembered that the float position must also serve in the back-dragging capacity, an operation which can be carried on for relatively long periods of time, it is seen that use of the restriction results in energy losses. Therefore, the amount of restriction is limited because severe restriction would result in large energy losses accompanied by intolerable heating of the hydraulic oil. In addition to decreasing operating efficiency, this heating can also cause serious maintenance problems.

The object of this invention is to provide a control valve for performing the operations mentioned above without incurring undue energy losses. According to the preferred form of the invention, the control valve has five operative positions, viz: the four positions mentioned above and a fifth or "power float" position in which both sides of the fluid motor are connected with the pump and the two sides of the fluid motor together with the pump are connected in restricted communication with the reservoir. When the valve is used in a bulldozer blade control system, the "power float" position effects dropping of the blade without loss of control and with a minimum amount of cavitation because the positive pressure afforded by the restriction forces hydraulic fluid into the expanding chamber of the motor. The back-dragging operation, on the other hand, is carried out by shifting the valve to the "float" position so that the pump is unloaded to the reservoir. By providing separate valve positions for carrying out each of these operations, it is possible to effect rapid dropping of the blade followed by fast motor response when the valve is shifted to the "lower" position to commence the digging operation.

A preferred embodiment of the invention will now be described in relation to the accompanying drawings, in which:

Fig. 2 is a sectional view taken on line 2—2 of Fig. 1.

Fig. 4 is a view similar to Fig. 1 showing the valve plunger in its "lower" position.

Fig. 5 is a view similar to Fig. 1 showing the valve plunger in its "float" position.

Fig. 6 is a view similar to Fig. 1 showing the valve plunger in its "power float" position.

Figure 1:
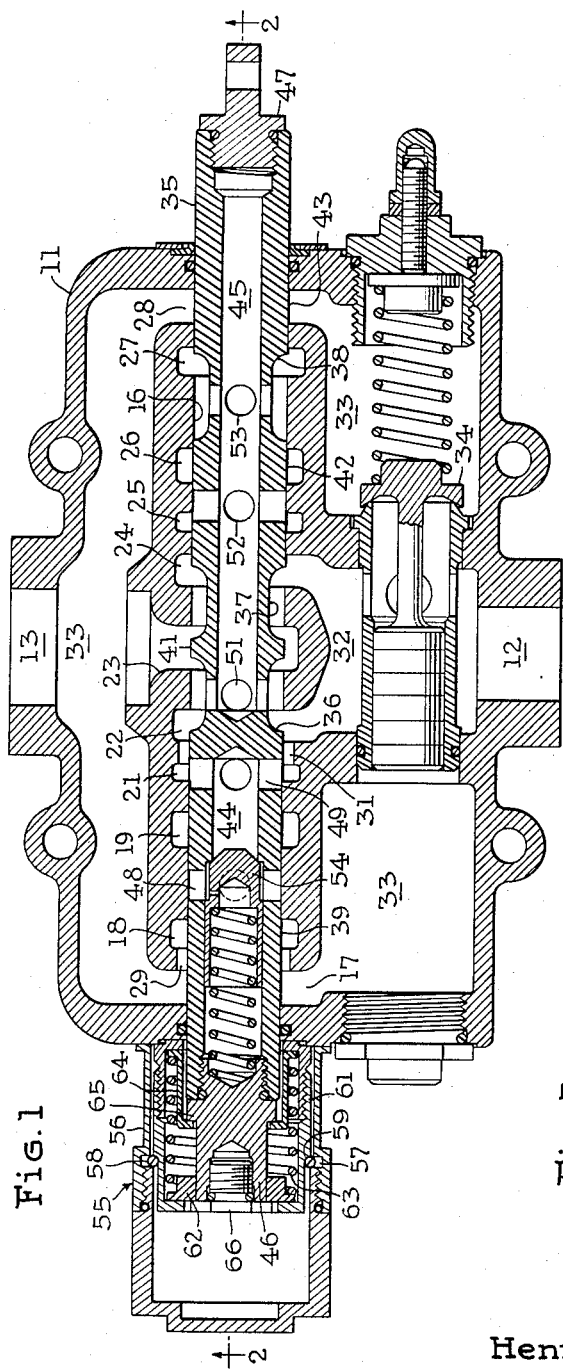
Fig. 1 is an axial section of the valve showing the plunger in its "neutral" position.

Referring to Figs. 1 and 2, the valve comprises a housing 11 having inlet and exhaust ports 12 and 13, respectively, and two motor ports 14 and 15. Extending through the housing is a bore 16 encircled by eleven longitudinally spaced annular chambers 17 through 19 and 21 through 28. The bore 16 is counterbored at 29 and 31 to provide continuously open flow paths between chambers 17 and 18 and between chambers 21 and 22 respectively. Chambers 22 and 24 communicate with inlet port 12 via passage 32 while chambers 17, 23 and 28 communicate with exhaust port 13 via passage 33. A cored passageway 30 interconnects chambers 21 and 25. Conventional relief valve 34 bypasses pressure fluid from passage 32 to passage 33.

Mounted in bore 16 is a slidable valve plunger 35 formed with three longitudinally spaced grooves 36, 37 and 38 which define valve lands 39, 41, 42 and 43. Extending inward from opposite ends of the plunger 35 are two axial bores 44 and 45 whose outer ends are closed and sealed by threaded plugs 46 and 47. Two circumferential series of radial passages 48 and 49 intersect axial bore 44 and three similar series 51, 52, 53 intersect bore 45. A conventional spring-biased check valve 54 is mounted within bore 44 for preventing back flow from radial passages 48 into the bore 44.

Associated with the left end of the valve plunger 35 (as viewed in Fig. 1) is a centering device 55. This device includes a two-part casing 56 which is attached to the housing 11 by bolts (not shown) and which, on its inner periphery, contains an annular groove 57. Mounted in this groove is an elastic split ring 58 which, in the Fig. 1 position of the valve, rests against an inclined shoulder 59 formed on a sleeve 61 which encircles the valve plunger 35. Mounted on the outer periphery of plug 46 is a slidable collar 62 which serves as a seat for one end of biasing spring 63. The other end of the spring is seated on the outturned flange of a sleeve 64 having an inturned flange engaging the shoulder 65 formed on plug 46. A stop member 66 is threaded into the outer end of plug 46 and is arranged to engage slidable collar 62.

Operation

Prior to operation, inlet and outlet ports 12 and 13 are connected with a pump and reservoir (not shown), respectively, and motor ports 14 and 15 are connected with the opposite sides of a piston motor 67 by lines 68 and 69, respectively. With the plunger in its "neutral" position (Figs. 1 and 2), fluid entering inlet port 12 passes freely to the reservoir via passage 32, annular chambers 22 and 24, plunger grooves 36 and 37, annular chamber 23, passage 33 and exhaust port 13. The motor ports 14 and 15 are isolated from each other and from inlet and exhaust ports 12 and 13 by plunger lands 39 and 42, respectively.

Figure 3:
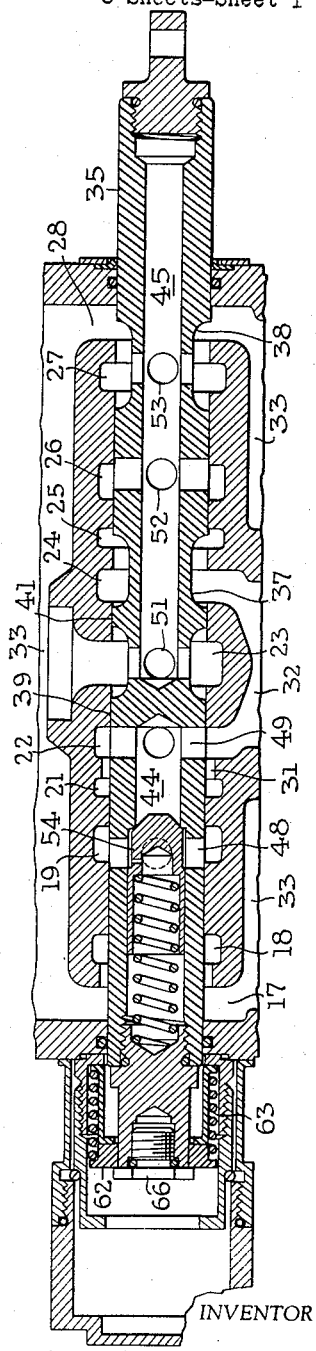
Fig. 3 is a view similar to Fig. 1 but showing the valve plunger in its "raise" position.

Assume that motor 67 is connected to the earth-moving blade of a bulldozer. In order to raise the blade, the operator moves the valve plunger 35 to the right to "raise" position shown in Fig. 3, against the bias of spring 63 acting through collar 62 and stop member 66. In this position, plunger lands 39 and 41 interrupt communication between inlet and exhaust ports 12 and 13 and the fluid delivered by the pump flows to the rod end of motor 67 via passage 32, annular chamber 22, radial passages 49, axial bore 44, check valve 54, radial passages 48, annular chamber 19, motor port 14 and line 68. Pressure fluid is also delivered to the rod end of the motor 67 along a path including passage 32, annular chamber 24, plunger groove 37, annular chamber 25, passageway 30, annular chamber 21, counterbore 31, radial passages 49, and axial bore 44. Fluid is exhausted from the piston end of the motor to the reservoir via line 69, motor port 15, annular chamber 26, radial passages 52, axial bore 45, and either radial passages 51, annular chamber 23, passage 33 and exhaust port 13 or radial passages 53, annular chamber 27, plunger groove 38, annular chamber 28, passage 33 and exhaust port 13. When the motor 67 has moved the desired distance, the operator releases plunger 35 and spring 63 will return it to the "neutral" position cutting off flow to and from the motor and unloading the pump.

It should be noted that a positive pressure will exist in annular chamber 19 when the blade is in an elevated position. Check valve 54 prevents release of this pressure when the valve plunger 35 is moved to the "raise" position, and thus it serves to maintain the blade in its current position during the time interval required for the pump to build-up operating pressure in axial bore 44.

If the operator wants to lower the blade, he moves the plunger 35 to the left from the Fig. 1 position to the "lower" position shown in Fig. 4. This motion is resisted by spring 63 acting through sleeve 64 and shoulder 65. In this position, plunger lands 41 and 42 interrupt communication between inlet and exhaust ports 12 and 13. High pressure fluid flows to the piston end of motor 67 via passage 32, annular chambers 22 and 24, radial passages 51 and 52, axial bore 45, radial passages 53, annular chamber 26, motor port 15 and line 69. The rod end of the motor is exhausted to the reservoir via line 68, motor port 14, annular chamber 19, radial passages 49, axial bore 44, check valve 54, radial passages 48, annular chamber 18, counterbore 29, annular chamber 17, passage 33 and exhaust port 13. When the operator releases the plunger 35, spring 63 will again return it to the "neutral" position.

Back-dragging can be carried out by moving the plunger 35 from its "neutral" position of Fig. 1 to the left to the "float" position of Fig. 5. In moving to the "float" position, the plunger 35 first moves to the "lower" position in which spring 63 is fully compressed and there is a rigid link established between plunger 35 and sleeve 61 through the inturned flange of sleeve 64 and slidable collar 62. Further movement to the left from the "lower" position causes inclined shoulder 59 to force split ring 58 outward into groove 57. The ring 58 and groove 57 form an impositive detent and indicate to the operator that he has moved the plunger 35 through the "lower" position. Movement of the inclined shoulder 59 to the left past ring 58 disengages the detent and permits sleeve 61 to shift to the position shown in Fig. 5 wherein ring 58 comes to rest in V-groove 71. The position of sleeve 61 relative to plunger 35 in Fig. 5 is the same as it is in Fig. 1. The operator may now release the plunger and the temporary detent formed by split ring 58 and V-groove 71 will retain it in the Fig. 5 position.

In the float position, the two motor ports 14 and 15 are interconnected by annular chamber 19, plunger groove 36, radial passages 51, axial bore 45, radial passages 53, plunger groove 38, and annular chamber 26. This interconnection also communicates with inlet port 12 via radial passages 51, plunger groove 36, counterbore 31 and passage 32. Another interconnecting path is formed by plunger groove 36, annular chamber 21, passageway 30, annular chamber 25 and plunger groove 38. It should be noted that the unloading path between inlet port 12 and exhaust port 13 comprising passage 32, plunger groove 37, annular chamber 23 and passage 33 is unrestricted. Therefore, in this position, the motor 67 can reciprocate freely under the influence of external forces for long periods of time and the pump is fully unloaded.

In order to return the plunger 35 to the "neutral" position, the operator must pull the plunger to the right, compressing spring 63 and bringing the plunger into rigid contact with sleeve 61 through stop member 66, collar 62, and sleeve 64. Additional force will cause ring 58 to rise out of V-groove 71, thus freeing the impositive detent. Spring 63 will now expand and shift sleeve 61 to the right. Further movement of plunger 35 will move sleeve 61 to the position wherein ring 58 is again resting against inclined shoulder 59. The operator can now release the plunger 35 and spring 63 will return it to the "neutral" position.

Dropping of the bulldozer blade can be effected by shifting the valve plunger 35 to the left from the Fig. 1 position to the "power float" position of Fig. 6. This position is reached by first shifting the plunger 35 to the "float" position and then continuing the shift against the bias of spring 63 until stop 66 contacts the casing 56. In this position, the two motor ports 14 and 15 and the inlet port 12 are interconnected in the same manner as in the "float" position. However, now the communication between inlet and exhaust ports 12 and 13 through annular chamber 22, plunger groove 37, annular chamber 23 and passage 33 is interrupted by plunger land 42. In lieu of this path, the two ports 12 and 13 are connected by annular chamber 22, counterbore 31, annular groove 21, plunger groove 36, radial passages 51, axial bore 45, radial passages 52, annular chamber 23 and passage 33. It is important to note that the clearance between the left edges of radial passages 52 and the right edge of annular chamber 23 (as viewed in Fig. 6) is very small. This clearance constitutes a restricted loading path and creates a back pressure in axial passage 45 which forces fluid into both sides of motor 67. The size of this clearance and consequently the restriction it affords depends on the characteristics of the particular installation in which the valve is to be used. In some cases, it may be necessary to close this loading path in order to provide the volume and pressure required to maintain the expanding chamber of motor 67 filled with fluid. Because of this, it will be understood that the term "restricted" is used herein to mean partially obstructed as well as closed.

The foregoing discussion is based on the assumption that the output of the pump is sufficient to maintain the working chambers of the motor liquid-filled at all times provided the restriction in the loading path is properly selected. If this is not true, then it will be obvious that the working chambers will not always be liquid-filled and that the control valve, even though it incorporates a closed loading path, will serve only to minimize and not prevent cavitation.

If the operator should release the plunger when it is in the "power float" position, spring 63 will return it to "float" position. The plunger can then be returned to the "neutral" position in the manner described above.

While the invention has been described in connection with a system for positioning the earth-moving blade of a bulldozer, it will be obvious that it has general utility and that it should not be limited to such a use. Furthermore, since many structural changes can be made in the preferred embodiment without departing from the inventive concept, the following claims should provide the sole measure of the scope of the invention.

What is claimed is:

1. A valve comprising a housing having inlet and exhaust ports and first and second motor ports; passageways interconnecting the four ports; a movable valve element carrying valving heads which cooperate with seats in the housing to control flow through the passageways, the valve element being shiftable in reverse directions from a neutral position and having four other operative positions; and means for shifting the valve element between two limiting positions located on opposite sides of the neutral position, the valve element when moving between limiting positions passing successively through a first operative position in which means carried by the valve element and the housing connect the inlet and exhaust ports with the first and second motor ports, respectively, and isolate the inlet and exhaust ports from each other, the neutral position in which means carried by the valve element and the housing interconnect the inlet and exhaust ports and isolate each motor port from the other three ports, a third operative position in which means carried by the valve element and the housing connect the inlet and exhaust ports with the second and first motor ports, respectively, and isolate the inlet and exhaust ports from each other, a fourth operative position in which means carried by the valve element and the housing connect the two motor ports with the inlet port and establish unrestricted communication between the inlet port and the exhaust port, and a fifth operative position in which means carried by the valve element and the housing connect the two motor ports with the inlet port and establish restricted communication between these three ports and the exhaust port.

2. A valve comprising a housing having inlet and exhaust ports and first and second motor ports; passageways interconnecting the four ports; and a shiftable valve element carrying valving heads which cooperate with seats in the housing to control flow through said passageways, said valve element having five operative positions, viz: a first position in which means carried by the valve element and the housing interconnect the inlet and exhaust ports and isolate each motor port from the other three ports, second and third positions in which means carried by the valve element and the housing isolate the inlet port from the exhaust port and connect it with the first and second motor ports, respectively, while connecting the exhaust port with the second and first motor ports, respectively, a fourth position in which means carried by the valve element and the housing connect the two motor ports with the inlet port and establish unrestricted communication between the inlet port and the exhaust port, and a fifth position in which means carried by the valve element and the housing connect the two motor ports with the inlet port and establish restricted communication between these three ports and the exhaust port.

3. A valve comprising a housing having inlet and exhaust ports and first and second motor ports; passageways interconnecting the four ports; and a shiftable valve element carrying valving heads which cooperate with seats in the housing to control flow through said passageways, said valve element having five operative positions, viz: a first position in which means carried by the valve element and the housing isolate each motor port from the other three ports, second and third positions in which means carried by the valve element and the housing isolate the inlet port from the exhaust port and connect it with the first and second motor ports, respectively, while connecting the exhaust port with the second and first motor ports, respectively, a fourth position in which means carried by the valve element and the housing connect the two motor ports with the inlet port and connect the inlet port with the exhaust port, and a fifth position in which means carried by the valve element and the housing connect the two motor ports with the inlet port and establish restricted communication between these three ports and the exhaust port.

References Cited in the file of this patent

UNITED STATES PATENTS 1,099,161     Brown _____ June 9, 1914